(12) United States Patent
Lecerf (10) Patent No.: US 10,640,192 B2
(45) Date of Patent: May 5, 2020

(54) AIRCRAFT HAVING A REMOVABLE HOLD

(71) Applicant: AIRBUS HELICOPTERS, Marignane (FR)

(72) Inventor: Luc Lecerf, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 545 days.

(21) Appl. No.: 15/351,909

(22) Filed: Nov. 15, 2016

(65) Prior Publication Data

US 2017/0137108 A1 May 18, 2017

(30) Foreign Application Priority Data

Nov. 17, 2015 (FR) ...................... 15 02396

(51) Int. Cl.
| | | |
|---|---|---|
| *B64C 1/22* | (2006.01) | |
| *B64D 9/00* | (2006.01) | |
| *B64C 27/04* | (2006.01) | |

(52) U.S. Cl.
CPC .................. *B64C 1/22* (2013.01); *B64D 9/00* (2013.01); *B64C 27/04* (2013.01)

(58) Field of Classification Search
CPC .............. B64C 1/22; B64C 27/04; B64D 9/00
USPC ...................................................... 244/118.2
See application file for complete search history.

(56) References Cited

U.S. PATENT DOCUMENTS

| | | | | | |
|---|---|---|---|---|---|
| 2,448,862 | A | * | 9/1948 | Conklin .................. | B64C 39/02 244/118.2 |
| 2,463,346 | A | * | 3/1949 | Akerman ................ | B64C 39/02 244/118.2 |
| 2,472,947 | A | * | 6/1949 | Hlobil ..................... | B64C 39/02 244/100 R |
| 2,557,962 | A | * | 6/1951 | Greene ................... | B64C 39/02 244/118.2 |
| 2,697,569 | A | * | 12/1954 | Westcott, Jr. ........... | B64C 39/02 244/118.2 |
| 3,361,396 | A | * | 1/1968 | Reno ....................... | B64C 39/02 244/118.2 |
| 3,778,011 | A | * | 12/1973 | Cannon ................... | B64C 27/00 224/401 |

(Continued)

FOREIGN PATENT DOCUMENTS

CN 203391991 1/2014

OTHER PUBLICATIONS

French Search Report for French Application No. FR 1502396, Completed by the French Patent Office, dated Jul. 26 2016, 6 Pages.

*Primary Examiner* — Richard R. Green
*Assistant Examiner* — Brady W Frazier
(74) *Attorney, Agent, or Firm* — Brooks Kushman P.C.

(57) ABSTRACT

An aircraft having an airframe including a hollow structure referred to as a "storage" structure, the storage structure having an opening that is open to the outside of the aircraft. A sealing device extends around the opening, the sealing device including at least one compressible gasket. A plurality of non-removable fittings are fastened to the storage structure. At least one removable storage shell comprises at least a covering configured to close the opening while compressing each gasket. Removable fittings of the storage shell are attached in reversible manner to the non-removable fittings by respective elongate fasteners passing through each removable fitting and the non-removable fitting.

21 Claims, 7 Drawing Sheets

(56) References Cited

U.S. PATENT DOCUMENTS

| | | | |
|---|---|---|---|
| 4,895,321 A | | 1/1990 | Huhn et al. |
| 5,360,129 A | | 11/1994 | Lee |
| 5,820,075 A | * | 10/1998 | Speakes .................... B64C 1/20 |
| | | | 244/118.2 |
| 5,961,071 A | * | 10/1999 | Proctor .................... B64D 9/00 |
| | | | 244/118.1 |
| 6,113,031 A | | 9/2000 | Williams et al. |
| 6,123,495 A | | 9/2000 | Callahan et al. |
| 6,595,568 B1 | | 7/2003 | Schroeder et al. |
| 7,946,530 B1 | * | 5/2011 | Talmage, Jr. ......... B64C 27/006 |
| | | | 244/118.2 |
| 8,888,041 B2 | * | 11/2014 | Hoffjann ................ B64D 11/02 |
| | | | 244/118.2 |
| 2006/0261216 A1 | * | 11/2006 | Landry ................ B64C 1/1415 |
| | | | 244/129.5 |
| 2007/0034739 A1 | * | 2/2007 | Yoeli .................... B64C 1/1415 |
| | | | 244/23 R |
| 2009/0014583 A1 | * | 1/2009 | Shelton .................... B64C 1/22 |
| | | | 244/118.2 |

* cited by examiner

AIRCRAFT HAVING A REMOVABLE HOLD

CROSS REFERENCE TO RELATED APPLICATION

This application claims priority to French patent application No. FR 15 02396 filed on Nov. 17, 2015, the disclosure of which is incorporated in its entirety by reference herein.

BACKGROUND OF THE INVENTION (1) Field of the Invention

The present invention relates to an aircraft having a removable hold. In particular, the aircraft may be a rotorcraft, such as a helicopter, for example.

The invention thus lies in the field of aircraft structures.

(2) Description of Related Art

An aircraft conventionally includes an airframe. On a rotorcraft, the airframe carries at least a main rotor that contributes to providing the aircraft with at least part of its lift, and possibly also its propulsion. Furthermore, the airframe may carry at least one system for controlling yaw movement of the aircraft, and by way of example it may have a system comprising a rotor referred to as a "tail" rotor because of where it is located on the airframe.

Thus, the airframe may have a main structure carrying each main rotor. Furthermore, the airframe may include at least one tail boom extending the main structure longitudinally rearwards so as to carry a tail rotor and possibly also a tail fin and/or a stabilizer.

The main structure defines a habitable zone. The habitable zone may include a cockpit and possibly also a cabin. Furthermore, the habitable zone may include a tapering intermediate structure that carries the tail boom.

By way of example, the main structure of the H225® helicopter comprises longitudinally and in succession from its nose towards its tail: a cockpit; a cabin; and an intermediate structure. The intermediate structure tapers rearwards so as to be extended by the tail boom. The tail boom then carries a tail rotor, while the main structure carries a main rotor.

In addition, an aircraft may include a non-removable baggage hold.

On a rotorcraft, the baggage hold may be secured to the intermediate structure, being arranged under the intermediate structure, where appropriate.

For example, the H225® helicopter has a substantially conical intermediate structure provided with a covering. The covering embodies the left and right flanks that extend in elevation and longitudinally from a bottom wall towards a top wall of the covering. The bottom wall then presents an opening.

In addition, the intermediate structure includes frames that extend in elevation and transversely between the flanks. One of the frames is referred to as a "junction" frame and is then fastened to the tail boom.

Under such circumstances, the intermediate structure includes in each flank a structural longeron fastened to the frames in the proximity of the opening.

The baggage hold comprises a C-shaped container fastened to the longerons. The container then has two sides secure with a bottom, each side extending a flank downwards. For example, each side is screwed and riveted to a longeron. In addition, a bead of sealant is interposed between each side of the container and a flank of the intermediate structure in order to make the installation water- and airtight.

In addition, the baggage hold has a door that is hinged to the container. In particular, the door is hinged to the bottom of the container.

The baggage hold then co-operates with the intermediate structure to define a zone referred to as a "cargo" zone that is suitable for receiving baggage. A person on the ground can open the door in order to put baggage into the cargo zone.

Documents U.S. Pat. Nos. 6,113,031, 5,360,129, 6,595,568, and 6,123,495 are remote from the invention and are mentioned purely by way of information.

Document U.S. Pat. No. 6,113,031 describes an aircraft having a loading space and a door closing the loading space. The door is opened during loading and then acts as a loading ramp.

Under such circumstances, a chest can be loaded into the loading space. The chest is thus not a component part of the aircraft.

Document U.S. Pat. No. 5,360,129 describes a baggage container, that is suitable for loading into an aircraft. The baggage container is thus not a component part of the aircraft.

Document U.S. Pat. No. 6,595,568 describes a protective covering used for keeping a vehicle compartment clean.

That document shows in particular a car and is therefore remote from the field of aircraft.

Document U.S. Pat. No. 6,123,495 describes a device to enable a fuel tank to be inserted in an isolated recess that is specially designed to receive the tank, possibly on board a helicopter. The tank is connected to the aircraft by straps that are wound in, in order to raise the tank into the recess in the aircraft. The tank is then attached to the helicopter and the straps are removed.

Documents U.S. Pat. Nos. 2,448,862 and 4,895,321 describe aircraft having removable containers.

Documents US 2006/261216 and CN 203391991 are also known.

BRIEF SUMMARY OF THE INVENTION

An object of the present invention is thus to propose an innovative aircraft capable of being adapted depending on the needs of a user.

According to the invention, an aircraft has an airframe extending longitudinally along an antero-posterior plane from a nose to a rear end, said airframe extending transversely from a first side to a second side and in elevation from a low portion to a high portion.

The antero-posterior plane may represent a plane of symmetry for certain elements of the airframe.

In addition, the low portion may co-operate with landing gear. The high portion may carry at least one main rotor that contributes to providing the aircraft with at least part of its lift.

Furthermore, the airframe includes a hollow structure referred to for convenience as a "storage" structure, which storage structure has an opening that is open to the outside of the aircraft.

Under such circumstances, the aircraft comprises:

a sealing device extending around the opening, the sealing device comprising at least one compressible gasket;

a plurality of attachment fittings referred to as "non-removable" fittings fastened to the storage structure, at least two non-removable fittings referred to as "first" non-removable fittings being arranged on the first side and at least two non-removable fittings referred to as "second" non-removable fittings being arranged on the second side; and at least one removable storage shell, only one of the storage shells being fastened to the non-removable fittings, each storage shell comprising:

at least one covering configured to close the opening while compressing each gasket; and an attachment fitting referred to as a "removable" fitting for each non-removable fitting, each removable fitting being configured to be attached reversibly to a non-removable fitting by an elongate fastener passing through the removable fitting and the non-removable fitting.

The term "non-removable" is associated with members that are not supposed to be removed from the aircraft, at least not without a major intervention. Conversely, the term "removable" is associated with members that are designed to be removed from the aircraft and replaced by some other member.

The term "storage structure" is used to designate a structure defining a hollow compartment suitable for receiving a load, such as baggage or a tank, for example.

The term "storage shell" is used to designate equipment that makes it possible to define at least part of a space that is suitable for receiving a load, such as baggage or a tank, for example.

Thus, the non-removable fittings are arranged permanently on the aircraft, e.g. by being riveted and/or screw-fastened to the attachment structure. Conversely, a storage shell that is arranged on the aircraft can easily be removed and replaced by another storage shell.

Certain aircraft have a non-removable baggage hold. The baggage hold is advantageous in that it enables baggage to be placed in the aircraft.

Nevertheless, the Applicant understands that a user might not need to have a baggage hold. In contrast, the user might have other needs, which according to the Applicant can include a need to maximize the range of the aircraft.

Consequently, the invention goes against common practice that consists in providing a baggage hold that is not removable. Under such circumstances, the storage structure represents a hollow compartment that is open to the outside via the opening.

The storage structure also has a sealing device that surrounds the opening in part or in full. One or more gaskets then define the opening.

Furthermore, the storage structure has non-removable fittings.

The user can then select the storage shell appropriate for the user's needs and fasten that storage shell to the non-removable fittings. The storage shell compresses each gasket and shuts the opening of the storage structure.

Under such circumstances, the opening is closed in sealed manner enabling the inside of the storage structure to be isolated from the medium outside the aircraft. The sealing device thus presents a sealing interface arranged between the storage shell and the storage structure.

In addition, fastening the storage shell to the storage structure is found to be relatively simple and fast. Specifically, fastening a removable fitting to a non-removable fitting is easily done by means of an elongate fastener. Such an elongate fastener may be in the form of a rod, a fastener, a pin, possibly a ball lock pin and the like.

Conversely, modifying a helicopter having a non-removable baggage hold can be extremely lengthy and onerous in the event that it becomes necessary to remove the hold. For example, removing a bead of sealant is far from being easy.

Furthermore, the invention may be adapted to existing aircraft, e.g. to the above-described H225 helicopter.

This interchangeability and modularity made available by the invention are far from obvious.

Specifically, replacing a particular storage shell with another storage shell can impact the weight and the center of gravity of the aircraft, and also the sealing of the aircraft. The Applicant has gone against those prejudices and observes that with the invention weight differences can remain of reasonable order. For example, the weight of baggage in a baggage hold may be of similar order to the weight of fuel present in an additional tank.

The invention may also include one or more of the following characteristics.

Thus, each storage shell is optionally selected from a list comprising a tank and a hold shell, said hold shell presenting a container having a U-shaped cross-section and a door.

The hold shell can then be fastened to the storage structure in order to transform the storage structure into a baggage hold.

The tank may be arranged at least in part in the storage structure in order to make it easy to maximize the range of the aircraft. The tank may then extend at least in part into the habitable zone, which is far from obvious.

A user may then decide to fit a habitable zone of an aircraft with an additional tank or with a baggage hold.

The tank may include at least one sealed bin. The sealed bin can then be fastened to the storage structure by means of the non-removable fittings and of its own removable fittings.

Optionally, the tank also includes at least one cover releasably fastened to the storage structure, being interposed locally between the storage structure and the bin.

These covers enable a bin to be used that is relatively simple in shape. The covers are then used to seal the installation.

Furthermore, this list may also include a hatch in the form of a plate matching the shape of the opening.

The plate then closes the opening.

Furthermore, the airframe comprises longitudinally a habitable zone followed by a tail boom, the airframe is provided with an intermediate structure secured to the tail boom, the intermediate structure tapering in a direction going from the nose towards the rear end, and the storage structure includes the intermediate structure.

The habitable zone may comprise a cockpit, possibly followed by a cabin and then by the storage structure. Consequently, the storage structure tapers in order to present height in elevation that decreases longitudinally. This reduction in height enables the storage structure to end up by being fastened to the tail boom, which presents a height that is much less than the height of the habitable zone.

Furthermore, the storage structure includes a mounting structure defining the opening at least in part, the mounting structure having two side beams arranged transversely on either side of the opening, each side beam carrying at least one gasket of the sealing device.

The storage structure may comprise a basic structure having a covering over structural frames and longitudinal longerons or indeed transverse ribs, like the intermediate structure of the H225 helicopter.

Under such circumstances, the mounting structure may be a component part of the storage structure by belonging to the basic structure, or it may be fastened to the basic structure in reversible or non-reversible manner. For example, the mounting structure may be fastened to the longerons of the storage structure. Consequently, the mounting structure can enable the invention to be applied to an existing aircraft.

Each side beam may include an angle bar presenting a sloping face extending in a plane presenting an acute angle of inclination relative to the antero-posterior plane, at least one gasket of the sealing device being carried by said angle bar.

This provision seeks to optimize the compression of each of the gaskets of the sealing device, and consequently to ensure that the storage shell can be installed and removed easily.

In addition, the mounting structure may include at least one U-shaped structural assembly, the structural assembly having two side walls secure with a bottom wall, each side wall being longitudinally adjacent to a side beam, each side wall and the bottom wall carrying at least one gasket of the sealing device.

Each structural assembly contributes to providing a sealing bead around the opening.

The structural assembly may be extended forwards by a closed permanent hold. This hold may be used for passing fuel pipes and/or electric wires to the opening, e.g. in order to enable a tank to be connected.

The storage structure may also include at least one rib extending between the two side beams. The rib carries at least one gasket of the sealing device.

In addition, the aircraft includes four first non-removable fittings and four second non-removable fittings.

This particular number of fittings enables a relatively heavy storage shell to be attached to the storage structure.

Furthermore, at least one non-removable fitting has a clevis, referred to as a "female" clevis for convenience, presenting two perforated lugs, a removable fitting comprising a perforated head, referred to as a "male" clevis, said male clevis having a lug configured to be arranged between the lugs of the female clevis, the lugs of the male and female clevises passing a rod of the elongate fastener.

The head may include a ball-joint hinge or a knuckle eye.

It is then relatively simple to fasten a removable fitting to a non-removable fitting with an elongate fastener.

In particular, the elongate fastener may be a ball-lock pin.

It should be recalled that a ball-lock pin comprises a rod extending from a handle to an end having at least one ball, the ball being suitable for retracting into the rod when a force is exerted on the ball. Consequently, the ball is received in a setback in the rod while the pin is being inserted in the fittings, and it moves back out from the setback when the end of the pin comes out of the fittings. The fittings are then held between the head and the ball of the pin.

Each elongate fastener may extend longitudinally along an axis, the axes of the elongate fasteners present on a given side of the aircraft being parallel to one another.

For example, said axis may constitute an axial axis of symmetry of a rod of the fastener.

All of the axes present on a given side of the aircraft then extend parallel to a common direction in this variant.

In particular, each elongate fastener may extend longitudinally along an axis, the axes of the elongate fasteners being horizontal when the aircraft is standing on horizontal ground.

The use of horizontal fasteners makes it easier to remove the fasteners by keeping them away from a covering of the storage structure.

Furthermore, and by way of example, the first non-removable fittings are arranged in a first plane and the second non-removable fittings are arranged in a second plane, the first and second planes intersecting and not being parallel to the antero-posterior plane.

This positioning can enable relatively simple tooling to be designed for fastening the removable fittings to the non-removable fittings.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
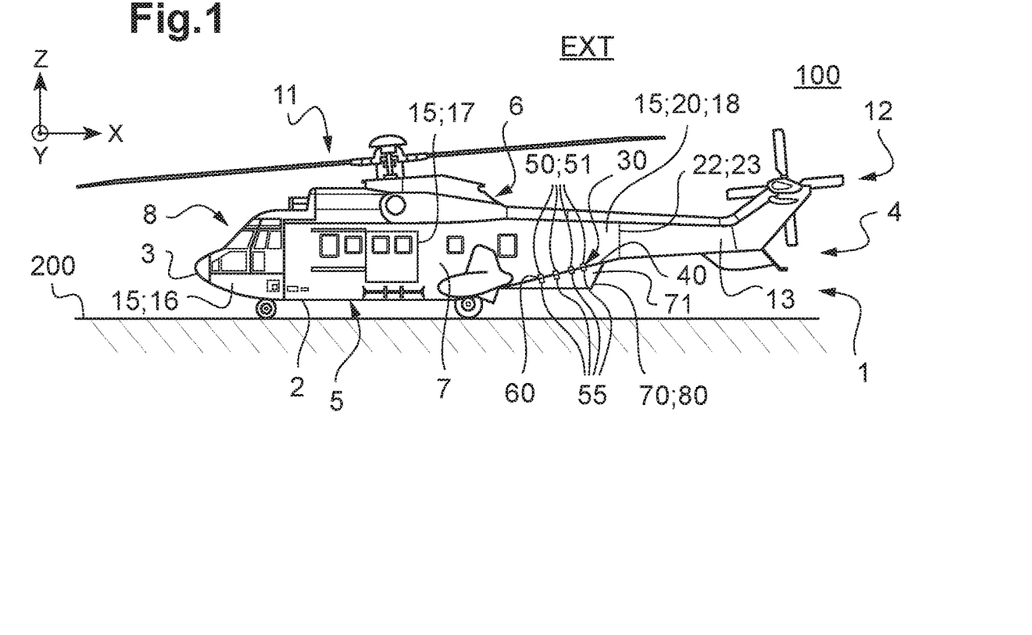
FIG. 1 is a view of an aircraft of the invention.

FIG. 1 shows an aircraft 1 of the invention.

The aircraft 1 comprises an airframe 2 that extends longitudinally along an antero-posterior plane 100 from a nose 3 to a rear end 4. The airframe 2 also extends transversely from a first side 7 to a second side 8 in a transverse direction perpendicular to the antero-posterior plane 100. Finally, the airframe extends in elevation in a vertical direction from a low portion 5 towards a high portion 6, the vertical direction being present in the antero-posterior plane 100 and being perpendicular to the transverse direction.

The airframe 2 comprises longitudinally and in succession a habitable zone 15 followed by a tail boom 13. The habitable zone may comprise a segment referred to as the "cockpit" 16 for receiving a pilot, followed by a segment referred to as a "cabin" for receiving passengers, and by a segment referred to as an "intermediate structure" 18. The intermediate structure 18 tapers going from the nose 3 towards the rear end 4 in order to be fastened to the tail boom 13. The cockpit 16 and/or the cabin 17 may be located under a mechanical zone, e.g. receiving the engines.

The aircraft 1 may be a rotorcraft provided with at least one main rotor 11 over the habitable zone 15, and possibly over the mechanical zone. The main rotor 11 contributes to providing the aircraft with at least part of its lift, and possibly also its propulsion. Furthermore, the tail boom 13 may carry a rear rotor 12, and possibly also a tail fin and stabilizers.

In addition, the low portion is provided with landing gear. The airframe is thus carried by the landing gear when the landing gear stands on ground 200.

Furthermore, the airframe includes a hollow structure referred to as a "storage structure" 20. The intermediate structure 18 may then represent the storage structure 20.

The storage structure 20 possesses an opening 30 that opens to the outside EXT of the aircraft 1 in the absence of closure means. The opening 30 may then put the habitable zone 15 into fluid flow communication with the ambient air surrounding the aircraft.

In the invention, a sealing device 40, as shown diagrammatically in FIG. 1, extends around the opening 30. This sealing device 40 may include at least one compressible gasket.

Furthermore, a plurality of attachment fittings referred to as "non-removable" fittings 50 are secured to the storage structure 20. In particular, at least two non-removable fittings 50 are referred to as "first" non-removable fittings 51 and they are arranged on the first side 7 of the aircraft. Likewise, at least two non-removable fittings referred to as "second" non-removable fittings are arranged on the second side 8 of the aircraft.

In addition, the aircraft 1 then has at least one removable storage shell 70.

For example, the aircraft may have a plurality of storage shells 70, even though only one storage shell is attached to the airframe 2. A user can thus select which storage shell is required for a particular mission.

Consequently, the storage shell should be selected from a list comprising a tank, a hold shell 80, or indeed a hatch.

In FIG. 1, the aircraft is fitted with the hold shell 80.

Each storage shell 70 comprises at least a covering 71 configured to close the opening 30, at least in part, while compressing each gasket. Under such circumstances, the interface between the storage shell and the storage structure is sealed.

In addition, each storage shell includes an attachment fitting referred to as a "removable" fitting 55 for each non-removable fitting 50. Each removable fitting 55 is configured to be attached in reversible manner to a non-removable fitting 50 by an elongate fastener 60. Each elongate fastener passes through a removable fitting 55 and a non-removable fitting 50 in order to fasten the storage shell to the storage structure.

FIGS. 2 to 13 show the invention in detail.

Figure 2:
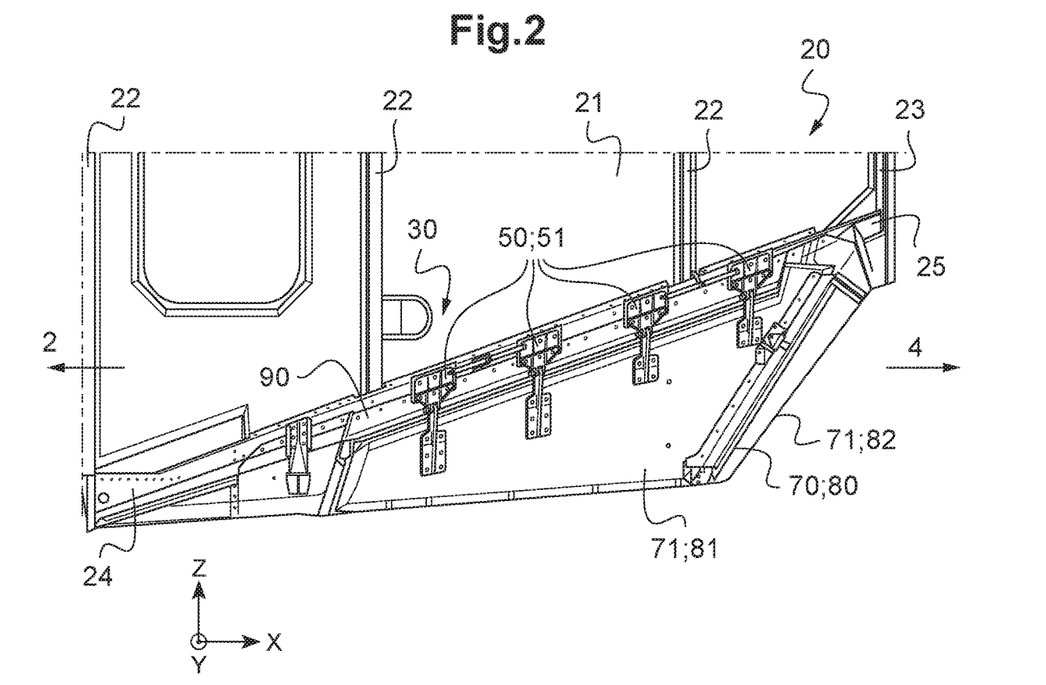
FIG. 2 is a view of the FIG. 1 storage shell.

Under such circumstances, FIG. 2 shows a storage structure 20 of the invention. The storage structure 20 comprises a basic structure having a plurality of structural reinforcing frames 22. The storage structure shown is an intermediate structure and one of the frames, referred to as a "junction" frame 23, serves in particular to be secured to the tail boom.

In addition, the basic structure may include longitudinal longerons 24 fastened to the frames, e.g. two longitudinal longerons 24 arranged transversely on either side of the opening 30 and of the antero-posterior plane 100.

Likewise, the basic structure may be provided with ribs 25 extending transversely between two longerons.

Furthermore, the basic structure includes an outer covering 21 defining a hollow inside zone. The outer covering is nevertheless not continuous and locally it presents said opening 30. In particular, the covering may comprise side flanks and a top wall or indeed a bottom wall partially defining the opening.

The fastener device may be carried in full or in part by the basic structure. For example, the gaskets may be carried by the longerons and the ribs in order to define an outline of the opening 30.

Nevertheless, the storage structure 20 may be provided with a mounting structure 90 that is interposed at least locally between a sealing gasket and the basic structure.

Figures 3, 4, 5:
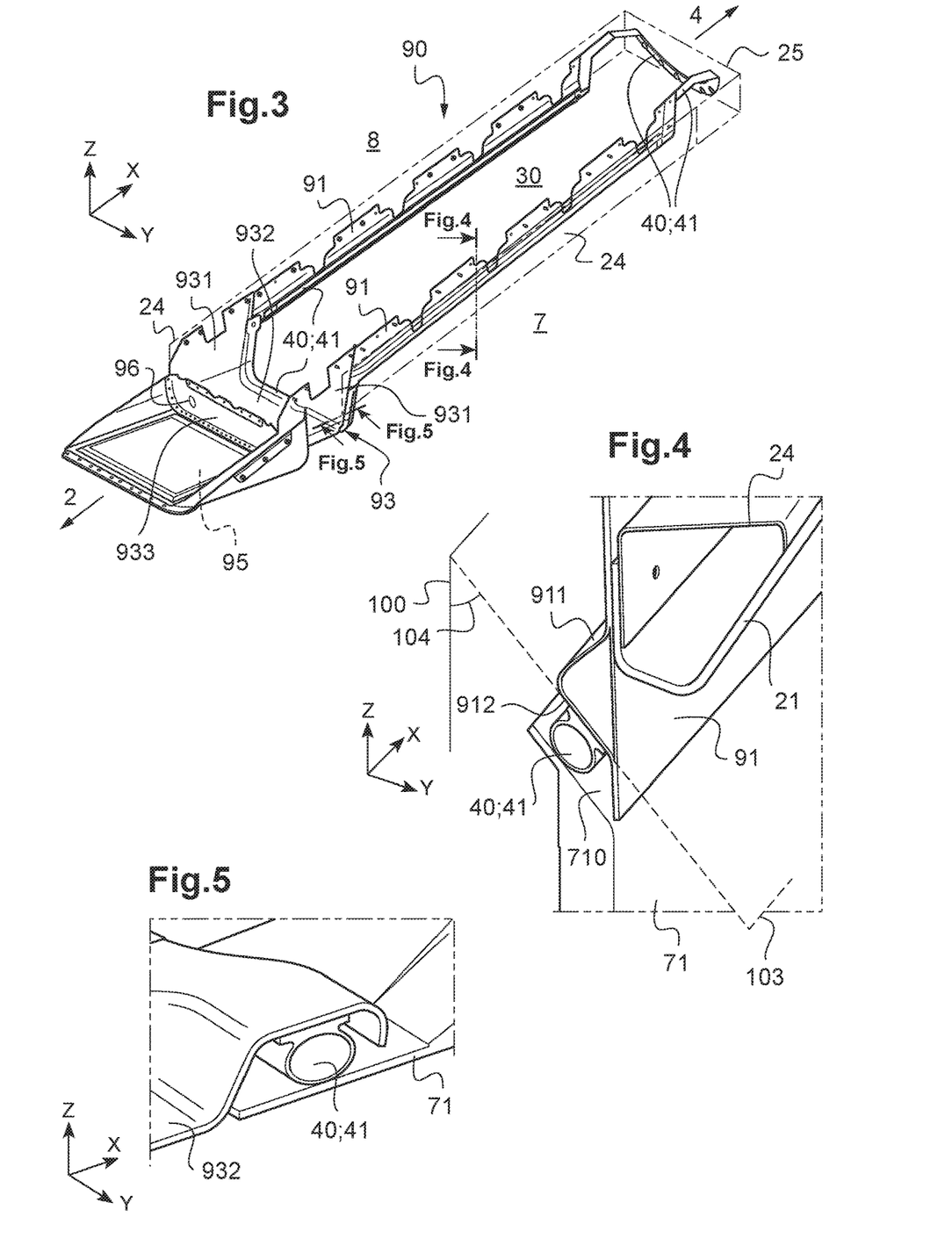
FIG. 3 is a three-dimensional view of a mounting structure.
FIGS. 4 and 5 are views showing a sealing gasket carried by a mounting structure.

With reference to FIG. 3, the mounting structure 90 may comprise two side beams 91 located transversely on either side of the opening 30. Each side beam is then fastened to a longeron of the basic structure by conventional welding, screw-fastening, riveting, adhesive, etc. means, or indeed by sealing means.

In addition, the mounting structure shown possesses at least one U-shaped structural assembly 93. This structural assembly 93 is provided with two side walls 931 secure with a bottom wall 932. Consequently, each side wall 931 is optionally fastened to the front of a side beam 91 by conventional welding, screw-fastening, riveting, adhesive, etc. means, or by sealing means. Each side wall 93 is thus longitudinally adjacent to a side beam 91. The opening 30 is then defined transversely by the side beam 91 and longitudinally at the front by the structural assembly 93.

In addition, the structural assembly 93 may include a partition 933. The partition 933 is provided with holes 96 configured to pass avionics wires and/or fluid pipes.

In addition, the mounting structure may possess a closed pipework fairing 95 secured to the structural assembly 93. The pipework fairing 95 may optionally be secured to the structural assembly 93 by conventional welding, screw-fastening, riveting, adhesive, etc. means, or indeed by sealing means.

Optionally, the opening 30 is defined at the rear of the side beams 91 by ribs 25 of the basic structure.

Alternatively, the mounting structure 90 includes at least one rear structure extending between the two side beams 91.

Under such circumstances, each side beam 91 is secured to at least one gasket 41 of the sealing device 40. Likewise, each side wall 931 and the bottom wall 932 of the structural assembly 93 carries at least one gasket 41 of the sealing device 40. Where appropriate, at least one rib 25 or indeed a segment of a longeron or a rear structure carries at least one gasket 41 of the sealing device 40.

FIG. 4 shows the interface between a covering 71 of a storage shell and a side beam 91. The side beam 91 is fastened to the longeron 24. The side beam caries a compressible gasket 41, such as a hollow gasket.

Optionally, each side beam 91 includes an angle bar 911. The angle bar has a sloping face 912. The face 912 is said to be a face that slopes relative to the antero-posterior plane. Specifically, the sloping face 912 extends in a sloping plane 103 having an acute angle 104 of inclination relative to the antero-posterior plane 100. Under such circumstances, at least one gasket of the sealing device is carried by the sloping face of the angle bar 911.

Consequently, the covering 71 of the storage assembly 70 presents a face 710 that is complementary to the sloping face 912.

FIG. 5 shows the interface between a covering 71 of a storage shell and the bottom wall 932 of the structural assembly 93. This bottom wall 932 carries a compressible gasket 41, such as a hollow gasket. For example, the bottom wall presents a dropped edge surrounding the gasket 41 in part.

Figure 6:
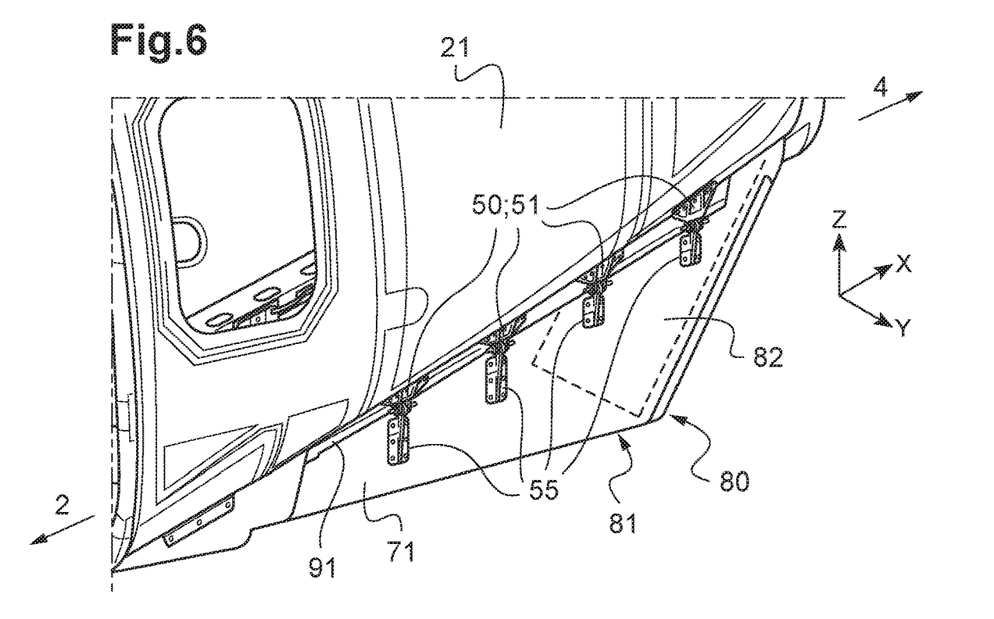
FIGS. 6 to 8 are views of a storage shell in the form of a hold shell.
Figure 7:
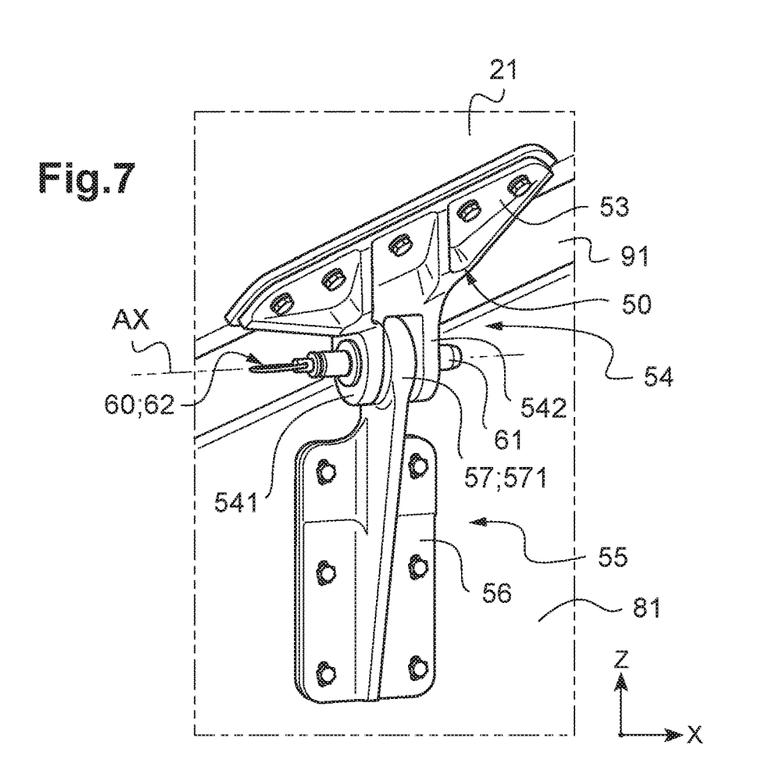
Figure 8:
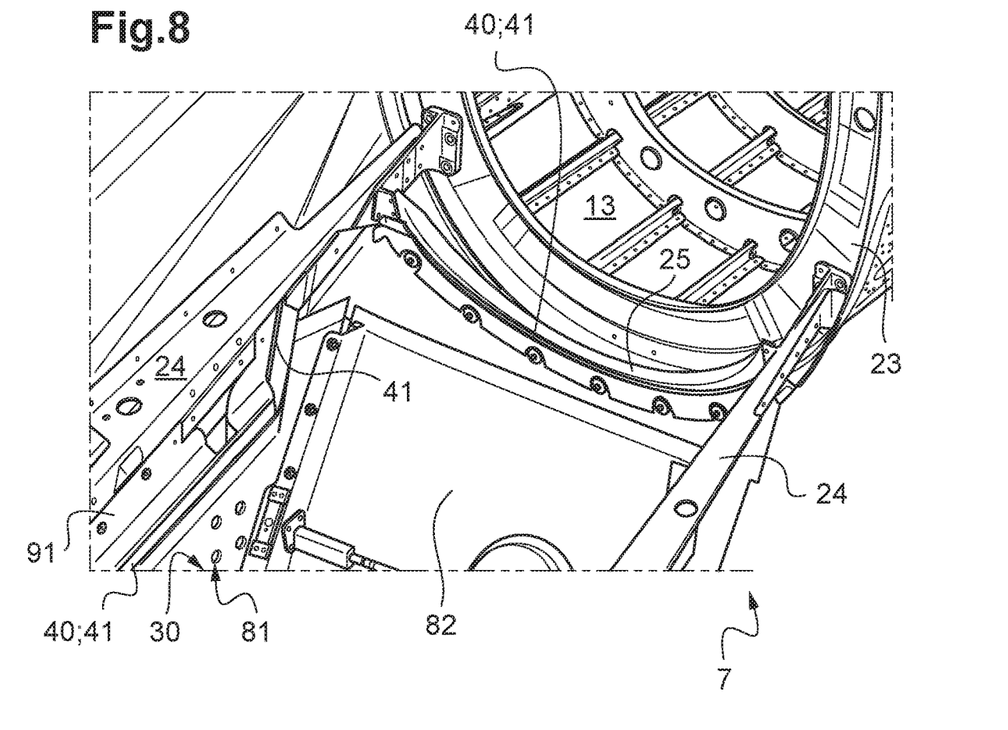

FIGS. 6 to 8 show the arrangement of a storage shell of the type comprising a hold shell 80.

The hold shell 80 comprises a container 81 constituting the covering of the hold shell and exerting force on each gasket of the sealing device. The container may have U-shaped cross-sections and longitudinal sections that are substantially triangular in shape. In addition, the hold shell includes a door 82 secured to a rear face of the container 81.

The container 81 then carries removable fittings 55 suitable for fastening to the non-removable fittings.

With reference to FIG. 7, and independently of the nature of the storage shell, each non-removable fitting 50 may possess a base referred to as a "non-removable" base 53 that is fastened to the storage structure by conventional welding, screw-fastening, riveting, adhesive, etc. means or indeed by sealing means. In the example of FIG. 7 the non-removable base 53 is screw-fastened to the outer covering 21 of the storage structure. Nevertheless, the base could equally well be fastened to a longeron, for example.

Figure 16:
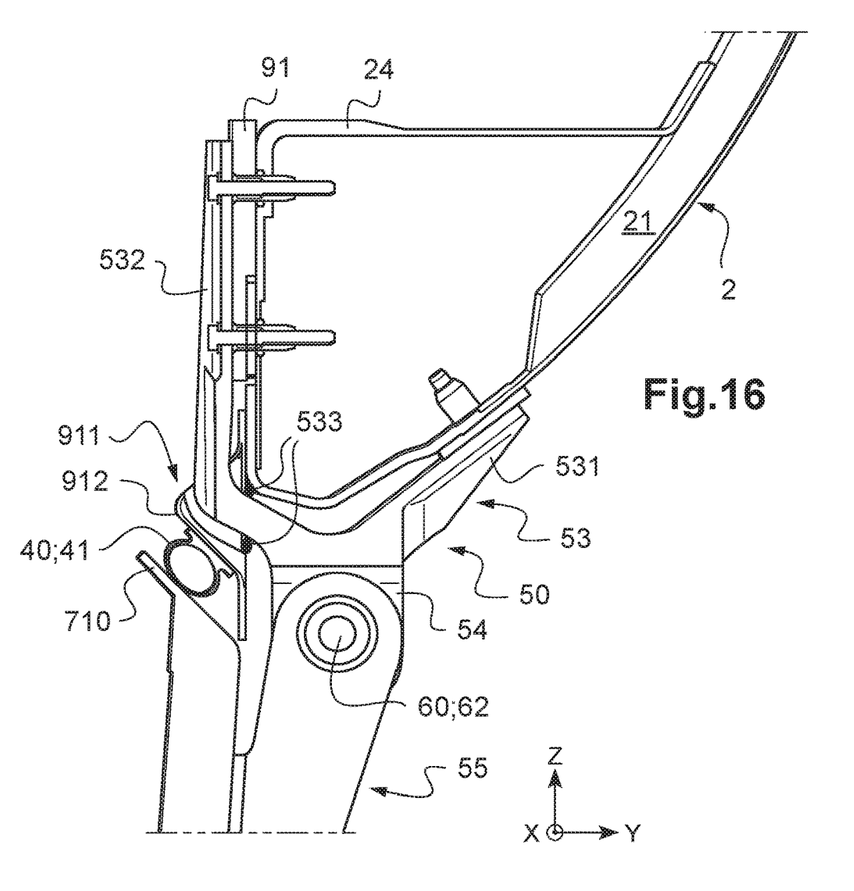
FIG. 16 is a view of a non-removable fitting having a base with two branches.

With reference to FIG. 16, the non-removable base 53 may have two branches 531 and 532 that are both fastened to the airframe 2.

Thus, the non-removable base 53 presents an outside branch 531 and an inside branch 532.

The inside branch 532 is fastened to the longeron 24 and to a longitudinal beam 91. The arrangement of the inside branch 532 is far from obvious for reasons of sealing. Nevertheless, this arrangement is made possible by placing the inside branch 532 above the sealing gaskets 41.

Under such circumstances, the inside branch 532 passes through the longitudinal beam, and for example the angle bar 91, so as to lead to the outside of the aircraft. Respective beads of sealant 533 may be arranged between the inside branch 532 and the longeron 24 and/or between the inside branch 532 and the longitudinal beam 91.

The outside branch 531 is then fastened to the covering.

This arrangement makes it possible to carry heavy loads.

Whatever the shape of the base, and with reference to FIG. 7, each non-removable fitting 50 possesses a female clevis carried by the base 53. This female clevis is then provided with two perforated lugs 541 and 542 that are longitudinally spaced apart from each other.

Under such circumstances, the corresponding removable fitting 55 possesses a "removable" base 56 that is fastened to the storage shell by conventional welding, screw-fastening, riveting, adhesive, etc. means, or indeed by sealing means. In the example of FIG. 7, the removable base 56 is screw-fastened to the container 81.

In addition, each removable fitting 55 possesses a head having a male clevis 57 carried by the removable base 56. This male clevis comprises a lug that is inserted between the two lugs 541 and 542 of the female clevis of the non-removable fitting.

The lug of the male clevis 57 has a hole that is situated in alignment with the holes in the lugs of the female clevis. For example, the lug of the male clevis 57 includes a ball-joint hinge 571.

Under such circumstances, the removable fitting 55 is attached to the non-removable fitting by an elongate fastener 60. This elongate fastener extends along an axis AX.

The elongate fastener thus comprises a rod 61 that passes longitudinally through the lugs 541 and 542 of the female clevis of the non-removable fitting and through the lug of the male clevis of the removable fitting. This elongate fastener may be embodied in the form of a ball-lock pin 62.

FIG. 8 shows a hold shell 80 with a shut door 82 as seen from a habitable space of the storage structure. FIG. 8 shows the pinching of each gasket 41.

FIGS. 9 to 12 show the arrangement of a tank-type storage shell 85.

The tank 85 comprises a sealed bin 86 embodying a covering of the hold shell that exerts a force on the sealing device. This bin can on its own serve to close the opening 30 by compressing each gasket.

Figure 9:
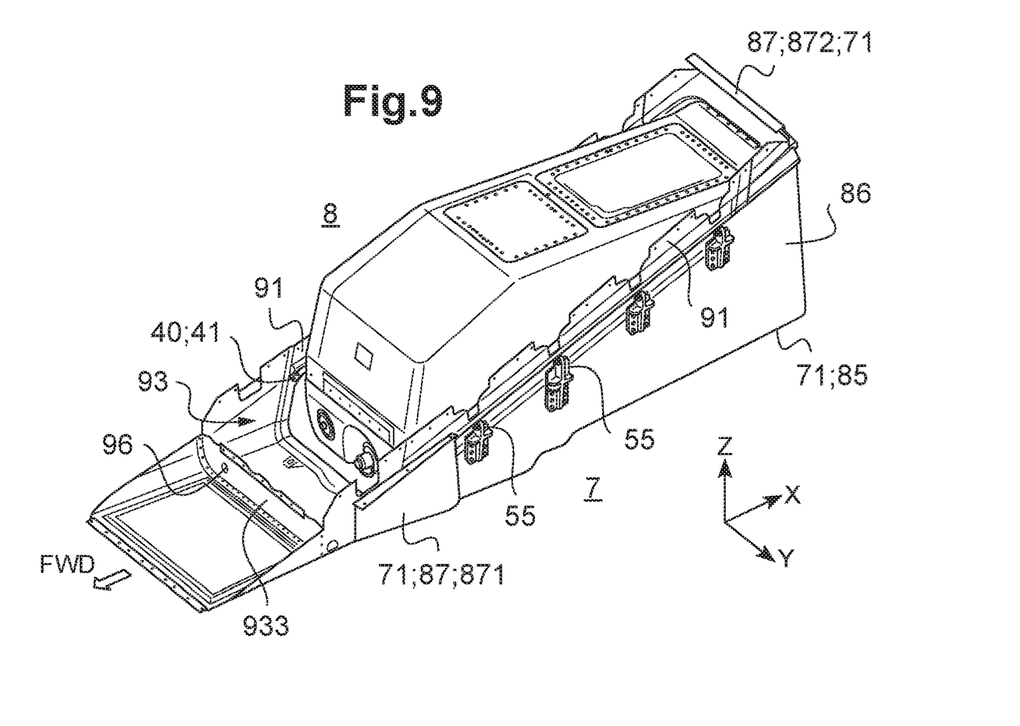
FIGS. 9 to 12 are views of a storage shell in the form of a tank.

Nevertheless, the bin may be of a shape that does not correspond completely to the shape of the opening 30.

Under such circumstances, the tank then includes at least one cover 87. Each cover 87 is interposed between the storage structure and the bin 86.

Figure 10:
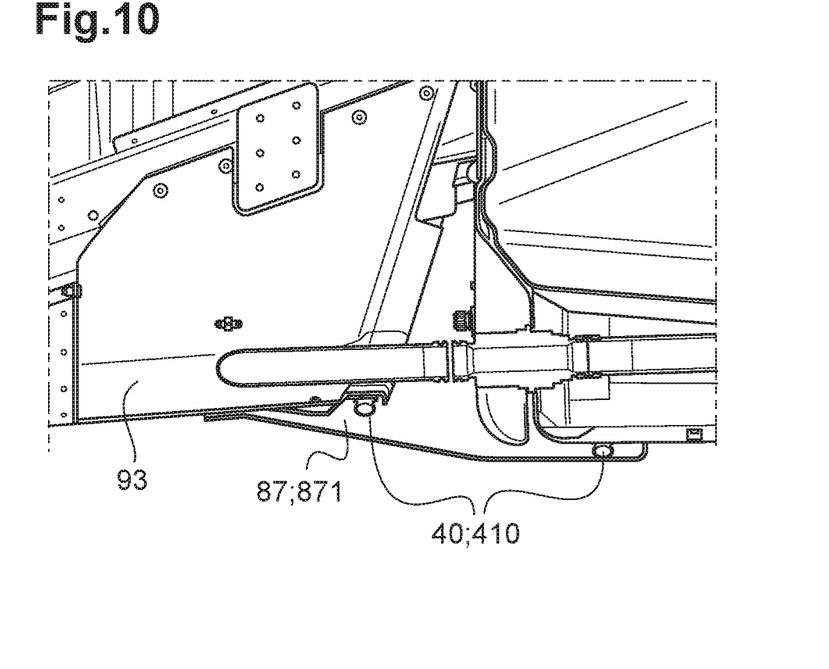

By way of example, a front cover 871 is interposed between the bin 87 and the structural assembly 93. With reference to FIG. 10, the front cover 871 compresses at least one gasket 41 of the sealing device. In addition, at least one gasket 410 may be arranged between the front cover 871 and the bin 86.

The front cover 871 gives access to various connections. Under such circumstances, the front cover 871 may possess a door or the equivalent.

Figure 11:
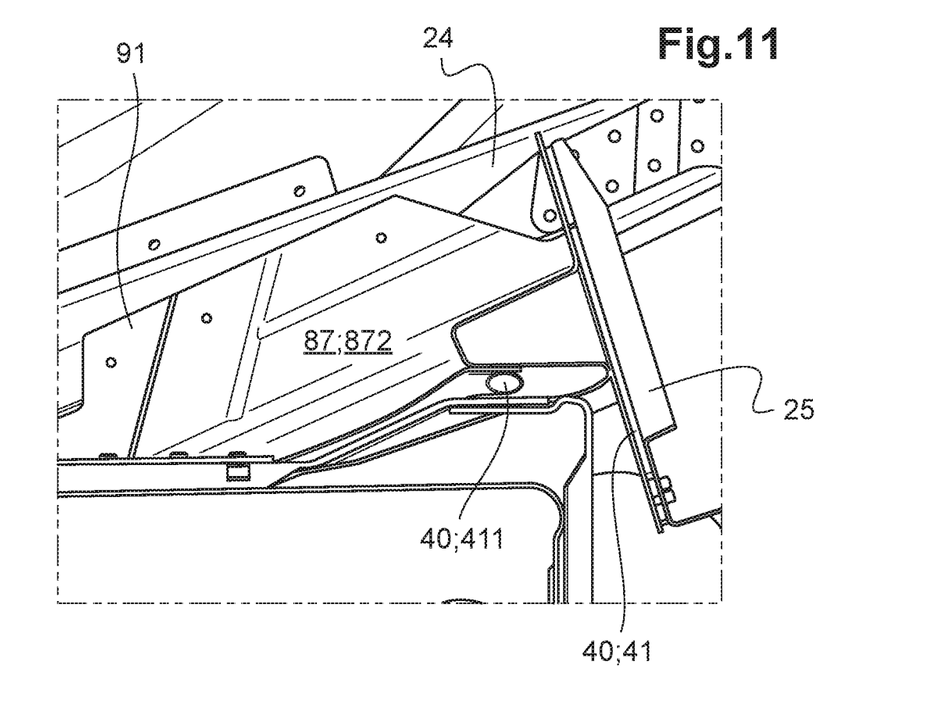

In addition, and with reference to FIG. 11, a rear cover 872 may be interposed between the bin 86 and the storage structure. For example, the rear cover may be fastened to the side beams of the mounting structure or to a rib and the longerons of the basic structure. The rear cover 872 may compress at least one gasket 41 of the sealing device. In addition, at least one gasket 411 may be arranged between the rear cover 872 and the bin 86.

Figures 12, 13:
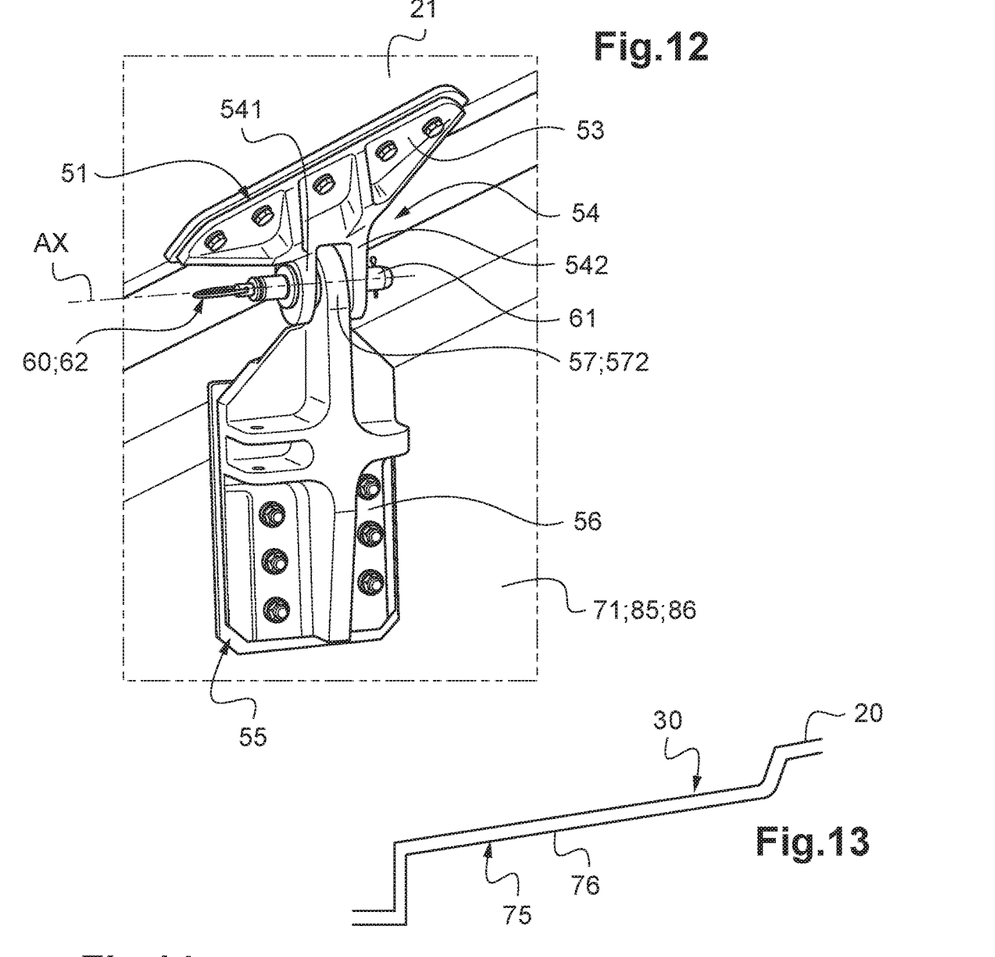
FIG. 13 is a view of a storage shell in the form of a hatch.

Consequently, and with reference to FIG. 12, the bin 86 is fastened by the removable and non-removable fittings 55 and 50 to the storage structure.

In addition, FIG. 12 shows a removable fitting having a head 57 including a knuckle eye 572.

It should be recalled that a knuckle eye comprises no more than a bushing or the equivalent that enables a pivot connection to be obtained with only one degree of freedom. In contrast, a ball-joint hinge has a ball providing more than one degree of freedom.

With reference to FIG. 13, a storage shell may include a hatch 75. The hatch 75 then comprises a single plate 76, possibly provided with a door, and of a shape that matches the opening 30.

Figure 14:
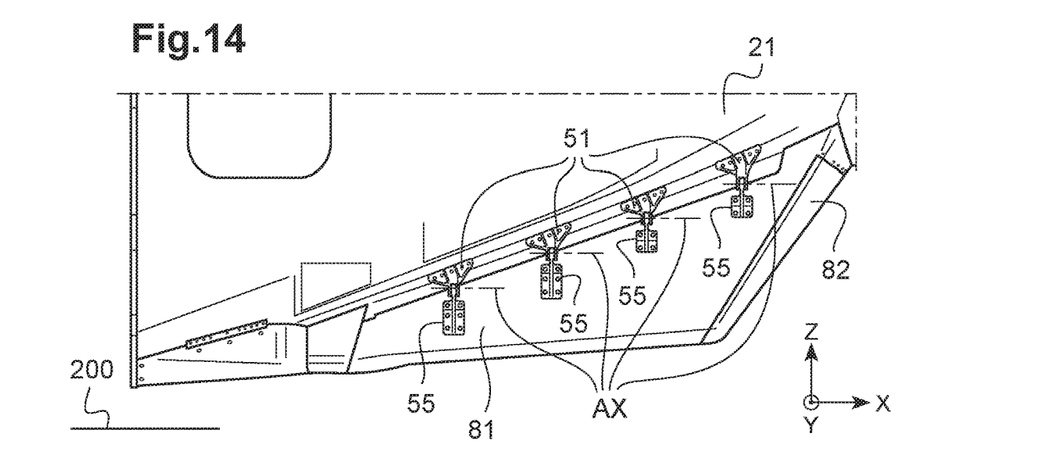
FIGS. 14 and 15 are views explaining the positioning of the fittings.

Furthermore, and with reference to FIG. 14, at least two non-removable fittings are arranged on either side of the aircraft. For example, four non-removable fittings are fastened on each side of the aircraft.

In addition, the axes AX of the elongate fasteners 60 on a given side of the aircraft may optionally be parallel to one another.

Furthermore, these axes AX are advantageously horizontal when the aircraft is standing on horizontal ground 200.

Figure 15:
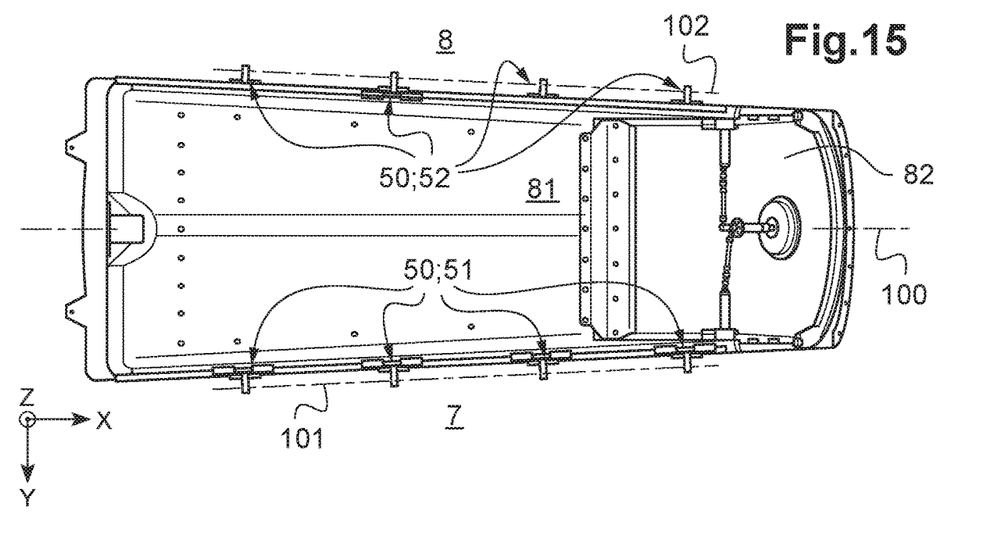

Furthermore, and with reference to FIG. 15, the first non-removable fittings 51 are arranged in a first plane 101 and the second non-removable fittings 52 are arranged in a second plane 102.

The term "arranged in a plane" means that the fittings in question present a hinged center lying in such a plane.

The first plane 101 and the second plane 102 then intersect and are not parallel to the antero-posterior plane 100.

Naturally, the present invention may be subjected to numerous variations and to its implementations. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft having an airframe extending longitudinally along an antero-posterior plane from a nose to a rear end, the airframe extending transversely from a first side to a second side and in elevation from a low portion to a high portion, the airframe including a hollow structure referred to as a "storage" structure, the storage structure having an opening that is open to the outside of the aircraft, wherein the aircraft comprises:
   a sealing device extending around the opening, the sealing device comprising at least one compressible sealing gasket;
   a plurality of attachment fittings referred to as "non-removable" fittings fastened to the storage structure, at least two non-removable fittings referred to as "first" non-removable fittings being arranged on the first side and at least two non-removable fittings referred to as "second" non-removable fittings being arranged on the second side; and
   at least one removable storage shell, only one of the storage shells being fastened to the non-removable fittings, each storage shell comprising:
      at least one covering configured to close the opening while compressing each gasket; and
      an attachment fitting referred to as a "removable" fitting for each non-removable fitting, each removable fitting being configured to be attached reversibly to a non-removable fitting by an elongate fastener passing through the removable fitting and the non-removable fitting;
   wherein the storage structure includes a mounting structure defining the opening at least in part, the mounting structure having two side beams arranged transversely on either side of the opening, each side beam carrying at least one gasket of the sealing device, wherein the mounting structure further includes an upwardly oriented U-shaped structural assembly having an upwardly oriented partition provided with holes configured to pass avionics wires and/or fluid pipes;
   wherein each storage shell comprises 1) a tank, 2) a hold shell comprising a container having a U-shaped cross-section and a door, or 3) a hatch comprising a plate shaped to match the opening.

2. The aircraft according to claim 1, wherein the airframe comprises longitudinally a habitable zone followed by a tail boom, the airframe is provided with an intermediate structure secured to the tail boom, the intermediate structure tapering in a direction going from the nose towards the rear end, and the storage structure includes the intermediate structure.

3. The aircraft according to claim 1, wherein each side beam includes an angle bar presenting a sloping face extending in a plane presenting an acute angle of inclination relative to the antero-posterior plane, at least one gasket of the sealing device being carried by the angle bar.

4. The aircraft according to claim 1, wherein the U shaped structural assembly comprises two side walls secured with a bottom wall, each side wall being longitudinally adjacent to a side beam, each side wall and the bottom wall carrying at least one sealing gasket of the sealing device.

5. The aircraft according to claim 1, wherein the storage structure includes at least one rib extending between the two side beams, the at least one rib carrying at least one sealing gasket of the sealing device.

6. The aircraft according to claim 1, wherein the aircraft includes four first non-removable fittings and four second non-removable fittings.

7. The aircraft according to claim 1, wherein at least one non-removable fitting has a clevis referred to as a "female" clevis presenting two perforated lugs, a removable fitting comprising a perforated head referred to as a "male" clevis, the male clevis having a lug configured to be arranged between the lugs of the female clevis, the lugs of the male and female devises passing a rod of the elongate fastener.

8. The aircraft according to claim 7, wherein the head includes a ball joint hinge or a knuckle eye.

9. The aircraft according to claim 1, wherein each elongate fastener comprises a ball lock pin.

10. The aircraft according to claim 1, wherein each elongate fastener extends longitudinally along an axis (AX), the axes (AX) of the elongate fasteners present on a given side of the aircraft being parallel to one another.

11. The aircraft according to claim 1, wherein each elongate fastener extends longitudinally along an axis (AX), the axes (AX) of the elongate fasteners being horizontal when the aircraft is standing on horizontal ground.

12. The aircraft according to claim 1, wherein the first non-removable fittings are arranged in a first plane and the second non-removable fittings are arranged in a second plane, the first and second planes intersecting and not being parallel to the antero-posterior plane.

13. The aircraft according to claim 1, wherein for each storage shell that comprises the tank, the tank includes at least one sealed bin.

14. The aircraft according to claim 13, wherein each tank includes at least one cover releasably fastened to the storage structure, being interposed locally between the storage structure and the bin.

15. An aircraft having an airframe extending longitudinally along an antero-posterior plane from a nose to a rear end, the airframe extending transversely from a first side to a second side and in elevation from a low portion to a high portion, the airframe including a hollow structure referred to as a "storage" structure, the storage structure defining an opening that is open to the outside of the aircraft, wherein the aircraft comprises:
   a sealing device extending around the opening, the sealing device comprising at least one compressible sealing gasket;
   a plurality of attachment fittings referred to as "non-removable" fittings fastened to the storage structure, at least two non-removable fittings referred to as "first" non-removable fittings being arranged on the first side and at least two non-removable fittings referred to as "second" non-removable fittings being arranged on the second side; and
   at least one removable storage shell, only one of the storage shells being fastened to the non-removable fittings, each storage shell comprising:
      at least one covering configured to close the opening while compressing each gasket; and
      an attachment fitting referred to as a "removable" fitting for each non-removable fitting, each removable fitting being configured to be attached reversibly to a non-removable fitting by an elongate fastener passing through the removable fitting and the non-removable fitting, each elongate fastener extending longitudinally along an axis (AX), the axes (AX) of the elongate fasteners present on a given side of the aircraft being parallel to one another;
   wherein each storage shell comprises 1) a tank, 2) a hold shell comprising a container having a U-shaped cross-section and a door, or 3) a hatch comprising a plate shaped to match the opening;

wherein the storage structure includes an upwardly oriented U-shaped structural assembly having an upwardly oriented partition provided with holes configured to pass avionics wires and/or fluid pipes.

16. An aircraft having an airframe extending longitudinally along an antero-posterior plane from a nose to a rear end, the airframe extending transversely from a first side to a second side and in elevation from a low portion to a high portion, the airframe including a hollow structure referred to as a "storage" structure, the storage structure defining an opening that is open to the outside of the aircraft, wherein the aircraft comprises:

a sealing device extending around the opening, the sealing device comprising at least one compressible sealing gasket;

a plurality of attachment fittings referred to as "non-removable" fittings fastened to the storage structure, at least two non-removable fittings referred to as "first" non-removable fittings being arranged on the first side and at least two non-removable fittings referred to as "second" non-removable fittings being arranged on the second side, the first non-removable fittings being arranged in a first plane and the second non-removable fittings being arranged in a second plane, the first plane and the second plane intersecting in a rearward direction of the aircraft and not being parallel to the antero-posterior plane, wherein the first and second non-removable fittings are together arranged in a third plane that intersects a longitudinal axis of the aircraft; and at least one removable storage shell, only one of the storage shells being fastened to the non-removable fittings, each storage shell comprising:

at least one covering configured to close the opening while compressing each gasket; and an attachment fitting referred to as a "removable" fitting for each non-removable fitting, each removable fitting being configured to be attached reversibly to a non-removable fitting by an elongate fastener passing through the removable fitting and the non-removable fitting;

wherein each storage shell comprises 1) a tank, 2) a hold shell comprising a container having a U-shaped cross-section and a door, or 3) a hatch comprising a plate shaped to match the opening.

17. The aircraft according to claim 16, wherein the storage structure includes an upwardly extending U-shaped structural assembly, the structural assembly having an upwardly extending partition, wherein the partition is provided with holes configured to pass avionics wires and/or fluid pipes.

18. The aircraft according to claim 1 wherein the U-shaped structural assembly comprises two side walls secured with a bottom wall.

19. The aircraft according to claim 18 wherein each side wall is fastened to a front of one of the side beams.

20. The aircraft according to claim 1 wherein the opening is defined transversely by the side beams and longitudinally at a front by the U-shaped structural assembly.

21. The aircraft according to claim 12 wherein the first and second planes intersect in a rearward direction of the aircraft.

* * * * *